United States Patent [19]

Okano et al.

[11] 4,296,648

[45] Oct. 27, 1981

[54] LUBRICATED FRICTION SPEED CHANGE GEARING

[75] Inventors: Hiroshi Okano; Akira Sato, both of Susono, Japan

[73] Assignees: Toyota Jidosha Kogyo Kabushiki Kaisha, Aichi; Kabushiki Kaisha Fujikoshi, Toyama, both of Japan

[21] Appl. No.: 85,256

[22] Filed: Oct. 16, 1979

[30] Foreign Application Priority Data

Dec. 15, 1978 [JP] Japan .................................. 53-156712

[51] Int. Cl.³ .............................................. F16H 13/08
[52] U.S. Cl. ........................................ 74/798; 74/206; 74/214; 74/467
[58] Field of Search ................. 74/798, 202, 214, 206, 74/785, 755, 788, 467, 772

[56] References Cited

U.S. PATENT DOCUMENTS

| 2,953,039 | 9/1960 | McRae | 74/798 X |
|---|---|---|---|
| 4,157,668 | 6/1979 | Fukuma et al. | 74/798 |
| 4,194,414 | 3/1980 | Satoh et al. | 74/798 X |

FOREIGN PATENT DOCUMENTS

| 164521 | 8/1955 | Australia | 74/798 |
|---|---|---|---|
| 665767 | 9/1938 | Fed. Rep. of Germany | 74/798 |
| 49-135073 | of 1974 | Japan | 74/798 |

*Primary Examiner*—Allan D. Herrmann
*Attorney, Agent, or Firm*—Stevens, Davis, Miller & Mosher

[57] ABSTRACT

A lubricated friction speed change gearing of the type which employs a plurality of cylindrical rollers mounted between a fixed outer race and a rotatable inner race in a compressed and elastically deformed condition, and a spider member having spider arms which are inserted between adjacent pairs of the rollers, thereby transmitting rotary power between the inner race and the spider member with change of rotational speed, wherein the spider members have substantially plane rigid surfaces which contact the outer surfaces of the rollers.

4 Claims, 4 Drawing Figures

LUBRICATED FRICTION SPEED CHANGE GEARING

BACKGROUND OF THE INVENTION

The present invention relates to a speed change gearing, and, more particularly, relates to a lubricated friction speed change gearing which transmits rotational power in a speed changing manner by utilizing planetary movement of a plurality of cylindrical rollers interposed between outer and inner races.

Such a friction speed change gearing having the aforementioned basic structure is known, and is practically used in accordance with various particular designs. In some old designs of this gearing, the spider member, which engages the cylindrical rollers mounted between the inner and outer races so as to take out reduced speed rotary power or so as to put in rotary power for its speed to be increased, was formed to have a bearing shaft at the tip end of each of its spider arms, adapted to engage a roller through a hole along its central axis, in a manner similar to the engagement of a bearing structure composed of a bearing shaft and a rotary hub. In this structure, however, when the gearing was operated at high speed, so that the rollers were rotated at even higher speed, a large quantity of heat was generated at the bearing portions, and, since the heat was not effectively dissipated, there was a danger that the bearing portions would undergo heavy wearing and/or burn sticking.

This problem with regard to the rotary contact between the cylindrical rollers and the spider arms is more difficult to solve because the cylindrical rollers are compressed and elastically deformed between the outer and inner races so as to become slightly elliptical, in order to generate traction force, based upon elastic fluid lubrication between the rollers and the inner and outer races, and therefore the cylindrical rollers do not provide any uniformly cylindrical bearing bores for receiving the bearing shaft portions of the spider arms. In order to avoid this problem it has been proposed in Japanese Patent Application No. 49793/73 (Japanese Laid-Open Publication No. 135073/74), one of the inventors of which is one of the inventors of the present invention, to construct a lubricated friction speed change gearing of the type which employs a plurality of cylindrical rollers mounted between inner and outer races and a spider member having spider arms each mounted between each two adjacent rollers so as to come into sliding contact with the outer surfaces of the cylindrical rollers. In this prior proposition the bearing surfaces of the spider member which slidingly contact the outer surfaces of the cylindrical rollers are each formed as a concavely curved surface which generally follows the convexly curved outer surface of the cylindrical roller, in order to provide the well known general slide bearing structure which forms a thin clearance extending along the two co-operating bearing surfaces for maintaining an oil film.

Further, in view of the fact that a lubricated friction speed change gearing of the type herein discussed which employs a plurality of cylindrical rollers mounted between inner and outer races can provide a high transmission efficiency, because the engagement between the cylindrical rollers and the inner and outer races is rolling engagement, which is inherently less subject to friction loss than is sliding engagement, and that in such a lubrication friction speed change gearing the sole sliding engagement, incorporated between the cylindrical rollers and the spider member, has a great influence on the overall transmission efficiency of the device, in order to accomplish further improvement in this regard, in the assignee's U.S. Pat. No. 4,157,668, it has been proposed to construct the spider member to have bearing shoes at its bearing portions where it contacts the rollers, the major portion of each of said shoes being capable of slight displacement relative to the body of said spider member, so as to form a gap capable of changing its shape between said portion of said shoe and the one of said rollers with which said shoe is in contact, so that the lubricant cushion is adapted to a wide range of operating conditions.

SUMMARY OF THE INVENTION

Although these prior propositions provide their intended improvements of a lubricated friction speed change gearing of the aforementioned type, as a result of various experimental researches made by us to pursue further improvement in performance of a lubricated friction speed change gearing of this type, we have found that, when a lubricated friction speed change gearing of this type is operated at high speed, due to the fact that the relative speed between the outer surfaces of the rollers and the bearing surfaces of the spider member is quite high, it is more desirable that the area of the lubricant film formed between the mutually contacting surfaces of the rollers and the spider member should be reduced to its necessary minimum than that a large area of lubricant film should be formed between those mutually contacting surfaces, by forming the bearing surface of the spider member to be concavely curved along the outer surface of the cylindrical roller, or by providing bearing shoes at the bearing portions of the spider member so that each of the shoes is capable of slight displacement relative to the body of the spider member, as proposed in the aforementioned prior applications, and that by reducing the lubricant film formed between the outer surfaces of the cylindrical rollers and the bearing surfaces of the spider member, the friction force generated in shearing the lubricant film is reduced so much that the overall efficiency of a speed change gearing of this type is improved.

Depending upon this discovery, in the present application we propose a lubricated friction speed change gearing comprising a housing, first and second rotary shafts rotatably supported in said housing on collinear axes, an inner race supported by said first rotary shaft, an outer race supported by said housing to be coaxial with said inner race, a plurality of cylindrical rollers mounted between said inner and outer races and compressed and elastically deformed therebetween, and a spider member supported by said second rotary shaft to engage among said rollers in sliding contact therewith and arranged to drive or be driven by said rollers when they perform planetary movement, said spider member having substantially plane rigid surfaces at its portions where it opposes and slidingly contacts said rollers.

By forming the spider member so as to have substantially plane rigid surfaces at its portions where it opposes and slidingly contacts said rollers, it is possible to maintain a lubricant film of the necessary minimum area between the cylindrical outer surfaces of the rollers and the substantially plane rigid surfaces of the spider member. In this case, on one side of the contact line between the cylindrical outer surface of the roller and the substantially plane rigid surface of the spider member is definitely formed a wedge space in which lubricant is entrained toward the gradually reducing clearance formed between the two confronting surfaces, whereby a lubricant film is formed, which, although its area is relatively small, has a high enough load supporting performance to ensure avoiding any direct contact between the outer surface of the roller and the bearing surface of the spider member. In this case, further, it is definitely avoided that this wedge clearance should disappear, as could occur in the bearing structure which employs a spider bearing surface formed as a concavely curved surface which follows the outer cylindrical surface of the roller, as in the case of employing a flexible bearing shoe member at the bearing portion of the spider member.

The substantially plane rigid bearing surface of the spider member may be formed with a groove or grooves extending in the direction of relative movement between the bearing surface and the outer cylindrical surface of the roller, so as to avoid lubricant, which is generally supplied from the side of the inner race, being accumulated beyond a proper amount in the space defined by the inner race, the cylindrical rollers, and the spider member.

BRIEF DESCRIPTION OF THE DRAWINGS

The present invention will become more fully understood from the detailed description given hereinbelow and the accompanying drawings, which however are given by way of illustration only, and thus are not limitative of the present invention, and wherein.

DESCRIPTION OF THE PREFERRED EMBODIMENTS

Figure 1:
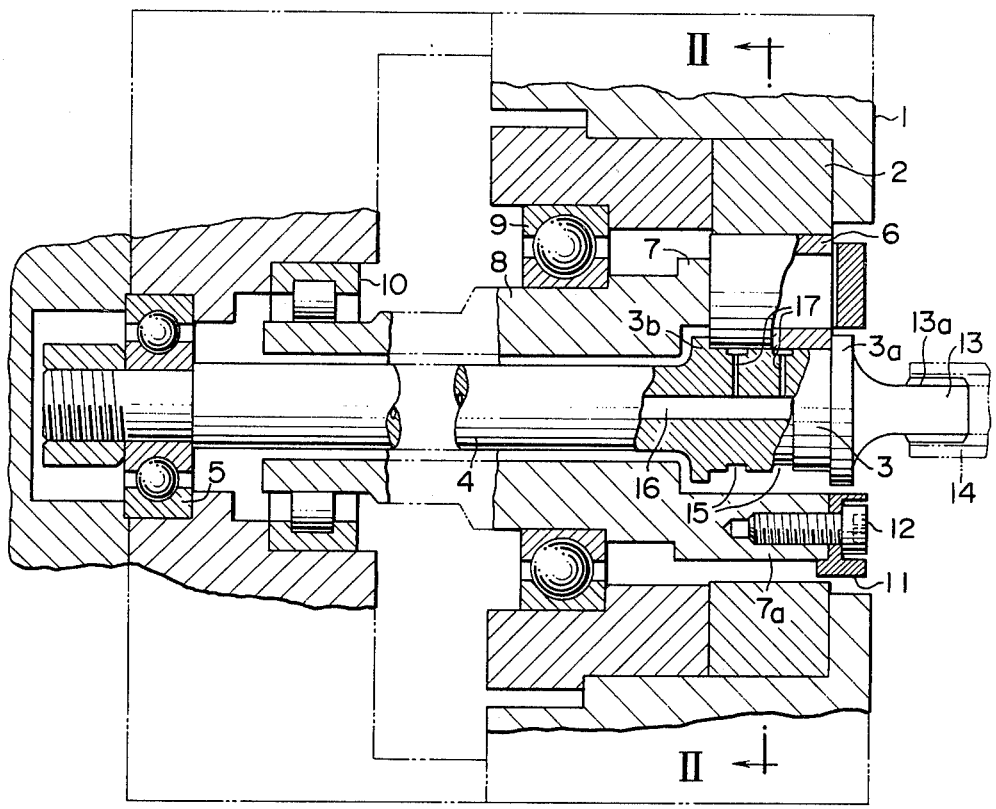
FIG. 1 is a longitudinal sectional view showing an essential part of a speed change device incorporating an embodiment of the lubricated friction speed change gearing of the present invention.

Referring to the drawings, 1 designates the overall housing of a speed change device, which also serves as the housing of a lubricated friction speed change gearing explained in detail hereinunder. In the housing 1 is incorporated an outer race 2, and collinearly with this is arranged an inner race 3. The inner race 3 is formed integrally with a rotary shaft 4, which is rotatably supported by a ball bearing 5 at its left end as seen in FIG. 1. Between the outer race 2 and the inner race 3 are provided a plurality (four in the shown embodiment) of hollow cylindrical rollers 6, which are compressed and elastically deformed between the outer and inner races.

A spider member 7 has, in this embodiment, four spider arms 7a, each of which is inserted between two adjacent cylindrical rollers 6. Further, in this embodiment the spider member 7 is formed integrally with a second rotary shaft 8 formed as a hollow shaft. The hollow rotary shaft 8 is rotatably supported from the housing 1 by a ball bearing 9 and a roller bearing 10. An annular stop 11 is attached to the tip end of the spider arms 7a so as to connect all of them, and is fixed to them by bolts 12. At the right end of the inner race 3 as viewed in FIG. 1 is formed a splined shaft portion 13 integrally with the inner race. The splined shaft portion 13 has splines 13a, which engage with an internally splined sleeve 14, which, in its right half portion as viewed in FIG. 1, engages onto a rotary shaft which transmits rotary power between it and the inner race 3.

The inner race 3 has flanged portions 3a and 3b at the opposite sides of its roller engaging surface, which serve to limit axial movement of the cylindrical rollers 6. In the shown embodiment the cylindrical surface of the inner race 3 is formed with two circumferential oil grooves 15, which are connected with an axial oil supply passage 16 formed along the central axis of the inner race and the rotary shaft 4 formed integrally with the inner race by way of radial oil supply passages 17. The axial oil supply passage 16 is, at its left end as viewed in FIG. 1, connected with an oil supplying means not shown in the figure so as to be supplied with lubricating oil.

The hollow rotary shaft 8 has a pinion formed as an integral part thereof at a portion located in its axially middle portion omitted and not shown in FIG. 1, and also supports a gearwheel at another portion located in its axially middle portion omitted and not shown in FIG. 1. The gearwheel is in meshing engagement with another gearwheel which is not shown either. Thus the rotary shaft 8 forms a part of a transmission mechanism which is incorporated in an overall housing, a part of which is shown as the housing 1.

Figure 2:
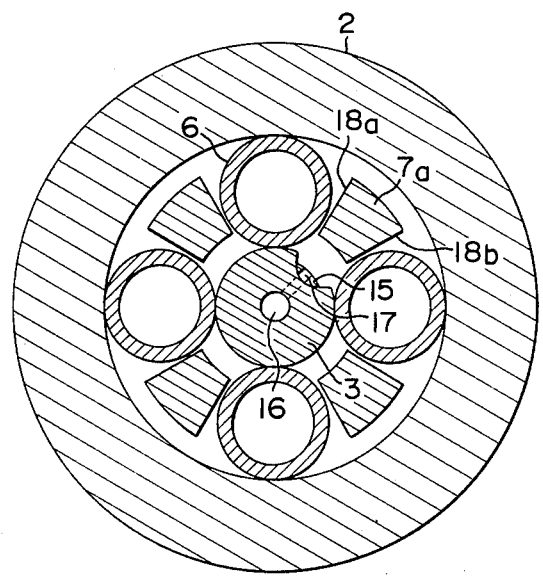
FIG. 2 is a sectional view along line II—II in FIG. 1.
Figure 3:
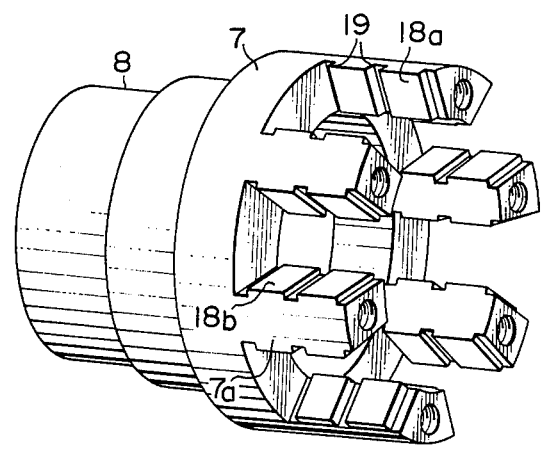
FIG. 3 is a perspective view showing an embodiment of the spider element.

As better shown in FIG. 2, which is a sectional view along line II—II in FIG. 1, and in FIG. 3, which shows a spider member 7, which is similar to the spider member 7 incorporated in the structure shown in FIGS. 1 and 2, except for the number of the spider arms, in an independent perspective view, the spider member 7 has roller receiving faces 18a and 18b at opposite sides of each spider arm 7a, each of which is adapted to slidingly contact the cylindrical outer surface of the roller 6. In the embodiment shown in FIGS. 2 or 3, the roller receiving faces are each formed as a plane extending substantially radially from the central axis of the speed change gearing. Further, as illustrated in FIG. 3, in this embodiment each of the roller receiving faces 18a and 18b is formed with two oil grooves 19 extending in the direction of relative movement of the face and the outer peripheral surface of the cylindrical roller 6. These grooves serve to release oil radially outwardly therethrough, so as to prevent oil supplied through the oil groove 17 into the space confined by the inner race 3, the cylindrical rollers 6, and the spider arms 7a being excessively accumulated in this space, thus effecting the desirable free circulation of oil through the speed change gearing.

In this case, assuming that the splined shaft portion 13 operates as a power input member of this speed friction gearing, and that this splined shaft member is driven clockwise as viewed from the right side of FIG. 1, the inner race 3 is also driven clockwise as viewed in FIG. 2, whereby the cylindrical rollers 6 make planetary movement clockwise in FIG. 2 while they rotate anticlockwise around their own axes. During this planetary movement and revolution, the rollers 6, supported by the reaction of the outer race 2, drive the hollow rotary shaft 8 in the clockwise direction as viewed in FIG. 2 at a rotational speed which has a predetermined ratio relative to that of the spline shaft portion 13. According to this planetary movement of the rollers 6, the spider member 7, which is kept in contact with the rollers at its roller receiving surfaces 18a, is also driven at the same speed as the planetary movement of the rollers. In this case, the other roller receiving surfaces 18b of the spider member do not substantially operate. These other roller receiving surfaces 18b operate when the spline shaft portion 13b, serving as the input member of the speed change gearing, is driven anticlockwise as viewed in FIG. 2. Or alternatively, the roller receiving faces 18b operate when the splined shaft portion 13 is inversely driven from the side of the hollow rotary shaft 8, as in the case where this speed change gearing is incorporated in the transmission of an automobile and when the automobile is operated in engine braking condition.

As apparent from FIG. 2, because of the construction that the roller receiving faces 18a and 18b which contact the cylindrical outer surfaces of the rollers 6 are formed substantially as plane surfaces at opposite sides of the contact line between the mutually contacting roller and roller receiving faces are definitely defined a pair of wedge spaces, which ensure entrainment of lubricant oil towards the contact line under any operating conditions of the speed change gearing and regardless of the rotational direction of the rollers. By this arrangement, particularly when the speed change gearing is operating at high speeds, an oil film having high load supporting capacity is definitely formed along the contact line. In this case, supply of oil necessary for forming the membrane is ensured by the aforementioned oil grooves 15, 19, and oil supply passages 16 and 17.

Figure 4:
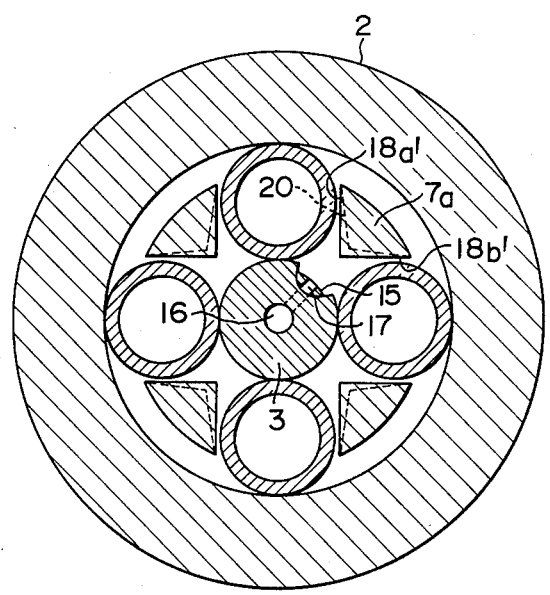
FIG. 4 is a view similar to FIG. 2, showing another embodiment of the lubricated friction speed change gearing of the present invention.

FIG. 4 is a view similar to FIG. 2, showing another embodiment of the lubricated friction speed change gearing of the present invention. In this embodiment, the arrangement of the roller receiving faces of the spider member is slightly different from that in the first embodiment shown in FIG. 2. That is, by contrast to the roller receiving faces 18a and 18b in the first embodiment, which extend substantially along a plane which includes the central axis of the inner and outer races, in this second embodiment the roller receiving faces 18a' and 18b' are arranged to cross each other at their inner ends at approximately right angles. Other various embodiments with regard to the inclination of the roller receiving faces would be possible, in order to obtain the best performance so as to support high load with as small a friction loss as possible, in accordance with various operating conditions of the speed change gearing.

In FIG. 4, the broken lines 20 show grooves which may be incorporated in the roller receiving faces 18a' and 18b'. These grooves operate in the same manner as the grooves 19 in the first embodiment.

Although the invention has been shown and described with respect to some preferred embodiments thereof, it should be understood that various changes and omissions of the form and the detail thereof may be made therein by those skilled in the art without departing from the scope of the invention.

We claim:

1. A lubricated friction speed change gearing comprising a housing, first and second rotary shafts rotatably supported in said housing on collinear axes, an inner race supported by said first rotary shaft, an outer race supported by said housing to be coaxial with said inner race, a plurality of cylindrical rollers mounted between said inner and outer races and compressed and elastically deformed therebetween, and a spider member supported by said second rotary shaft to engage among said rollers in sliding contact therewith and arranged to drive or be driven by said rollers when they perform planetary movement, said spider member having substantially plane rigid surfaces at its portions where it opposes and slidingly contacts said rollers, said surfaces each having a groove extending in the direction of relative movement of the outer surfaces of the co-operating rollers.

2. The gearing of claim 1, wherein each of said substantially plane rigid surfaces extends along a plane which includes the central axis of the inner and outer races.

3. The gearing of claim 1, wherein said spider member has a plurality of spider arms, each of which has a pair of said substantially plane rigid surfaces which cross each other substantially at right angles.

4. The gearing of claim 1, wherein the inner race has an oil supply passage which opens at its cylindrical outer surface for supplying lubrication oil.

* * * * *